(12) United States Patent
Corma et al.

(10) Patent No.: US 8,114,378 B2
(45) Date of Patent: Feb. 14, 2012

(54) ITQ-26, NEW CRYSTALLINE MICROPOROUS MATERIAL

(75) Inventors: Avelino Corma, Valencia (ES); Maria Jose Diaz, Valencia (ES); Fernando Rey, Valencia (ES); Karl G. Strohmaier, Port Murray, NJ (US); Douglas L. Dorset, Milford, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 408 days.

(21) Appl. No.: 12/085,798

(22) PCT Filed: Dec. 15, 2006

(86) PCT No.: PCT/US2006/047849
§ 371 (c)(1),
(2), (4) Date: Jun. 22, 2009

(87) PCT Pub. No.: WO2007/075382
PCT Pub. Date: Jul. 5, 2007

(65) Prior Publication Data
US 2009/0299121 A1 Dec. 3, 2009

(51) Int. Cl.
*C01B 39/46* (2006.01)
*C01B 39/48* (2006.01)
*B01J 29/10* (2006.01)
*B01J 20/18* (2006.01)
*C10G 45/00* (2006.01)

(52) U.S. Cl. ............ 423/718; 423/702; 502/60; 502/74; 208/143

(58) Field of Classification Search .............. 423/702, 423/718; 502/60, 74; 208/143
See application file for complete search history.

(56) References Cited

U.S. PATENT DOCUMENTS

| | | | |
|---|---|---|---|
| 3,354,078 A | 11/1967 | Miale et al. | |
| 4,310,440 A | 1/1982 | Wilson et al. | |
| 4,440,871 A | 4/1984 | Lok et al. | |
| 4,582,693 A * | 4/1986 | Desmond et al. | 423/706 |
| 4,707,345 A * | 11/1987 | Lok et al. | 423/704 |
| 6,797,254 B2 * | 9/2004 | Corma Canos et al. | 423/706 |
| 6,916,459 B2 * | 7/2005 | Corma Canos et al. | 423/718 |
| 7,014,836 B2 * | 3/2006 | Corma Canos et al. | 423/706 |
| 7,449,169 B2 * | 11/2008 | Corma Canos et al. | 423/718 |
| 8,025,864 B2 * | 9/2011 | Corma et al. | 423/718 |

(Continued)

FOREIGN PATENT DOCUMENTS
WO    WO 2005/108526  A2    11/2005

OTHER PUBLICATIONS

Flanigen, Edith M., et al., "Aluminophosphate Molecular Sieves and the Periodic Table", *Proc. 7th Int. Zeolite Conf.*, pp. 103-112 (1986).

(Continued)

*Primary Examiner* — David M Brunsman

(57) ABSTRACT

ITQ-26 (INSTITUTO DE TECNOLOOIA QUIMICA number 26) is a new crystalline microporous material with a framework of tetrahedral atoms connected by atoms capable of bridging the tetrahedral atoms, the tetrahedral atom framework being defined by the interconnections between the tetrahedrally coordinated atoms in its framework, ITQ-26 can be prepared in silicate compositions with an organic structure directing agent. It has a unique X-ray diffraction pattern, which identifies it as a new material. ITQ-26 is stable to calcination in air, absorbs hydrocarbons, and is catalytically active for hydrocarbon conversion.

17 Claims, 4 Drawing Sheets

1, 3 Bis (triethylphosphoniummethyl)-benzene
Structure directing agent

U.S. PATENT DOCUMENTS

2004/0089587 A1* 5/2004 Canos et al. ............. 208/111.01
2005/0008567 A1* 1/2005 Corma Canos et al. ...... 423/706

OTHER PUBLICATIONS

Serre, Christian, et al., "Hydrothermal synthesis, structure determination from powder data of a three-dimensional zirconium diphosphonate with an exceptionally high thermal stability: Zr(O3P-(CH2)-PO3) or MIL-57", *J. Mater. Chem.* 12, pp. 2367-2369 (2002).

Zheng, Nanfeng, et al., "Microporous and Photoluminescent Chalcogenide Zeolite Analogs", *Science* 298, pp. 2366-2369 (2002).

Anderson, M. R., et al., "The Crystal Structure of Lithium Hydrazinium Fluoroberyllate", *Acta Cryst.* B29, pp. 2625-2627 (1973).

Meier, W. M., et al., "The Topology of Three-Dimensional 4-Connected Nets: Classification of Zeolite Framework Types Using Coordination Sequences", *Journal of Solid State Chemistry* 27, pp. 349-355 (1979).

Sastre, German, "ZeoTsites : a code for topological and crystallographic tetrahedral sites analysis in zeolites and zeotypes", *Microporous and Mesoporous Materials* 43, pp. 27-40 (2001).

Tuel, Alain, et al., "NMR Characterization and Rietveld Refinement of the Structure of Rehydrated AlPO4-34", *Journal of Phys. Chem.* B 104, pp. 5697-5705 (2000).

Koller, H., "Five-Coordinate Silicon in High-Silica Zeolites", *Journal of American Chemical Society* 121, pp. 3368-3376 (1999).

"Superactive Crystalline Aluminosilicate Hydrocarbon Catalysts" (Letter to the Editor), *Journal of Catalysis* 4, pp. 527-529 (1965).

Miale, J. N., et al., "Catalysis by Crystalline Aluminosilicates", *Journal of Catalysis* 6, pp. 278-287 (1966).

Olson, D. H., et al., "Chemical and Physical Properties of the ZSM-5 Substitutional Series", *Journal of Catalysis* 61, pp. 390-396 (1980).

\* cited by examiner 1, 3 Bis (triethylphosphoniummethyl)-benzene
Structure directing agent Framework structure of ITQ-26 showing only the tetrahedral atoms. There is a single unit cell, whose edges are defined by the gray box X-ray diffraction pattern of as-synthesized ITQ-26.
Pattern measured with reflection geometry
using Cu Kα radiation.

X-ray diffraction pattern of calcined/dehydrated. Pattern measured with transmission geometry using synchrotron radiation ($\lambda = 0.8702$ Å).

ITQ-26, NEW CRYSTALLINE MICROPOROUS MATERIAL

BACKGROUND OF THE INVENTION

Microporous materials, including zeolites and silicoaluminophosphates, are widely used in the petroleum industry as absorbents, catalysts and catalyst supports. Their crystalline structures consist of three-dimensional frameworks containing uniform pore openings, channels and internal cages of dimensions (<20 Å) similar to most hydrocarbons. The composition of the frameworks can be such that they are anionic, which requires the presence of non-framework cations to balance the negative charge. These non-framework cations, such as alkali or alkaline earth metal cations, are exchangeable, either entirely or partially with another type of cation utilizing ion exchange techniques in a conventional manner. If these non-framework cations are converted to the proton form by, for example, acid treatments or exchange with ammonium cations followed by calcination to remove the ammonia, it imparts the material with Brønsted acid sites having catalytic activity. The combination of acidity and restricted pore openings gives these materials catalytic properties unavailable with other materials due to their ability to exclude or restrict some of the products, reactants, and/or transition states in many reactions. Non-reactive materials, such as pure silica and aluminophosphate frameworks are also useful and can be used in absorption and separation processes of liquids, gases, and reactive molecules such as alkenes.

The family of crystalline microporous compositions known as molecular sieves, which exhibit the ion-exchange and/or adsorption characteristics of zeolites are the aluminophosphates, identified by the acronym AlPO, and substituted aluminophosphates as disclosed in U.S. Pat. Nos. 4,310,440 and 4,440,871. U.S. Pat. No. 4,440,871 discloses a class of silica aluminophosphates, which are identified by the acronym SAPO and which have different structures as identified by their X-ray diffraction pattern. The structures are identified by a numerical number after AlPO, SAPO, MeAPO (Me=metal), etc. (Flanigen et al., *Proc. 7th Int. Zeolite Conf.*, p. 103 (1986) and may include Al and P substitutions by B, Si, Be, Mg, Ge, Zn, Fe, Co, Ni, etc. The present invention is a new molecular sieve having a unique framework structure.

ExxonMobil and others extensively use various microporous materials, such as faujasite, mordenite, and ZSM-5 in many commercial applications. Such applications include reforming, cracking, hydrocracking, alkylation, oligomerization, dewaxing and isomerization. Any new material has the potential to improve the catalytic performance over those catalysts presently employed.

There are currently over 150 known microporous framework structures as tabulated by the International Zeolite Association. There exists the need for new structures, having different properties than those of known materials, for improving the performance of many hydrocarbon processes. Each structure has unique pore, channel and cage dimensions, which gives its particular properties as described above. ITQ-26 is a new framework material.

SUMMARY OF THE INVENTION

ITQ-26 (INSTITUTO DE TECNOLOGÍA QUÍMICA number 26) is a new crystalline microporous material having a framework of tetrahedral atoms connected by bridging atoms, the tetrahedral atom framework being defined by the interconnections between the tetrahedrally coordinated atoms in its framework. ITQ-26 is stable to calcination in air, absorbs hydrocarbons, and is catalytically active for hydrocarbon conversion.

In one embodiment, the present invention is directed to a new crystalline material that is a silicate compound having a composition $mR:aX_2O_3:YO_2.nH_2O$ where R is an organic compound, X is any metal capable of tetrahedral coordination such as one or more of B, Ga, Al, Fe, Li, Be, P, Zn, Cr, Mg, Co, Ni, Mn, As, In, Sn, Sb, Ti, and Zr, more preferably one or more trivalent metals capable of tetrahedral coordination, and even more preferably one or more of the elements B, Ga, Al, and Fe, and Y is Si alone or in combination with any other tetravalent metal capable of tetrahedral coordination such as Ge and Ti and where m=0.01-1, a=0.00-0.2, and n=0-10 and having a unique diffraction pattern as given in Table 2.

In a more specific embodiment, the present invention is directed to a calcined crystalline silicate compound that has a composition $aX_2O_3:YO_2.nH_2O$, where X is any metal capable of tetrahedral coordination such as one or more of B, Ga, Al, Fe, Li, Be, P, Zn, Cr, Mg, Co, Ni, Mn, As, In, Sn, Sb, Ti, and Zr, more preferably one or more trivalent metals capable of tetrahedral coordination, and even more preferably one or more of the elements B, Ga, Al, and Fe, and Y is Si alone or in combination with any other tetravalent metal capable of tetrahedral coordination such as Ge and Ti and where a=0.00-0.2 and n=0-10 and having a unique diffraction pattern as given in Table 3.

The present invention also includes a method of synthesizing a crystalline silicate compound having the diffraction pattern similar to Table 2, by mixing together a source of silica, organic structure directing agent (SDA), water, and optional metal and heating at a temperature and time sufficient to crystallize the silicate.

The invention includes the use of ITQ-26 to separate hydrocarbons from a hydrocarbon containing stream.

The invention also includes the use of ITQ-26 as a hydrocarbon conversion catalyst for converting an organic feedstock to conversion products.

DETAILED DESCRIPTION OF THE PREFERRED EMBODIMENTS

Figure 1:
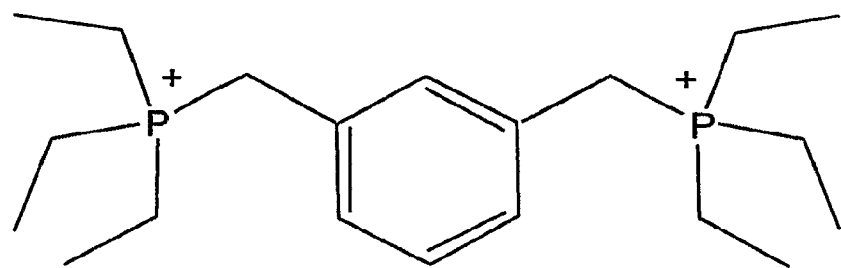
FIG. 1 is a representation of 1,3-bis-(triethylphosphonium-methyl)-benzene the organic structure directing agent (SDA).

The present invention is a new structure of crystalline material. As with any porous crystalline material, the structure of ITQ-26 can be defined by the interconnections between the tetrahedrally coordinated atoms in its framework. In particular, ITQ-26 has a framework of tetrahedral (T) atoms connected by bridging atoms, wherein the tetrahedral atom framework is defined by connecting the nearest tetrahedral (T) atoms in the manner given in Table 1.

TABLE 1

ITQ-26 tetrahedral atom interconnections

| T atom | Connected to: |
|---|---|
| T1 | T2, T5, T56, T68 |
| T2 | T1, T4, T57, T69 |
| T3 | T4, T17, T24, T43 |
| T4 | T2, T3, T6, T75 |
| T5 | T1, T7, T116, T120 |
| T6 | T4, T20, T27, T44 |
| T7 | T5, T14, T34, T70 |
| T8 | T9, T12, T53, T65 |
| T9 | T8, T11, T54, T66 |
| T10 | T11, T17, T24, T49 |
| T11 | T9, T10, T13, T72 |
| T12 | T8, T14, T111, T115 |
| T13 | T11, T20, T27, T50 |
| T14 | T7, T12, T40, T67 |
| T15 | T16, T19, T62, T71 |
| T16 | T15, T18, T63, T72 |
| T17 | T3, T10, T18, T31 |
| T18 | T16, T17, T20, T69 |
| T19 | T15, T21, T106, T110 |
| T20 | T6, T13, T18, T32 |
| T21 | T19, T28, T52, T73 |
| T22 | T23, T26, T59, T74 |
| T23 | T22, T25, T60, T75 |
| T24 | T3, T10, T25, T37 |
| T25 | T23, T24, T27, T66 |
| T26 | T22, T28, T101, T105 |
| T27 | T6, T13, T25, T38 |
| T28 | T21, T26, T46, T76 |
| T29 | T30, T33, T56, T68 |
| T30 | T29, T32, T57, T69 |
| T31 | T17, T32, T43, T49 |
| T32 | T20, T30, T31, T63 |
| T33 | T29, T34, T95, T100 |
| T34 | T7, T33, T40, T58 |
| T35 | T36, T39, T53, T65 |
| T36 | T35, T38, T54, T66 |
| T37 | T24, T38, T43, T49 |
| T38 | T27, T36, T37, T60 |
| T39 | T35, T40, T89, T94 |
| T40 | T14, T34, T39, T55 |
| T41 | T42, T45, T59, T74 |
| T42 | T41, T44, T60, T75 |
| T43 | T3, T31, T37, T44 |
| T44 | T6, T42, T43, T57 |
| T45 | T41, T46, T83, T88 |
| T46 | T28, T45, T52, T61 |
| T47 | T48, T51, T62, T71 |
| T48 | T47, T50, T63, T72 |
| T49 | T10, T31, T37, T50 |
| T50 | T13, T48, T49, T54 |
| T51 | T47, T52, T77, T82 |
| T52 | T21, T46, T51, T64 |
| T53 | T8, T35, T54, T55 |
| T54 | T9, T36, T50, T53 |
| T55 | T40, T53, T100, T135 |
| T56 | T1, T29, T57, T58 |
| T57 | T2, T30, T44, T56 |
| T58 | T34, T56, T94, T133 |
| T59 | T22, T41, T60, T61 |
| T60 | T23, T38, T42, T59 |
| T61 | T46, T59, T82, T131 |
| T62 | T15, T47, T63, T64 |
| T63 | T16, T32, T48, T62 |
| T64 | T52, T62, T88, T129 |
| T65 | T8, T35, T66, T67 |
| T66 | T9, T25, T36, T65 |
| T67 | T14, T65, T120, T127 |
| T68 | T1, T29, T69, T70 |
| T69 | T2, T18, T30, T68 |
| T70 | T7, T68, T115, T125 |
| T71 | T15, T47, T72, T73 |
| T72 | T11, T16, T48, T71 |
| T73 | T21, T71, T105, T123 |
| T74 | T22, T41, T75, T76 |
| T75 | T4, T23, T42, T74 |
| T76 | T28, T74, T110, T121 |
| T77 | T51, T78, T123, T131 |
| T78 | T77, T80, T124, T132 |
| T79 | T80, T91, T97, T113 |
| T80 | T78, T79, T81, T136 |
| T81 | T80, T93, T99, T114 |
| T82 | T51, T61, T88, T105 |
| T83 | T45, T84, T121, T129 |
| T84 | T83, T86, T122, T130 |
| T85 | T86, T91, T97, T118 |
| T86 | T84, T85, T87, T134 |
| T87 | T86, T93, T99, T119 |
| T88 | T45, T64, T82, T110 |
| T89 | T39, T90, T127, T133 |
| T90 | T89, T92, T128, T134 |
| T91 | T79, T85, T92, T103 |
| T92 | T90, T91, T93, T132 |
| T93 | T81, T87, T92, T104 |
| T94 | T39, T58, T100, T120 |
| T95 | T33, T96, T125, T135 |
| T96 | T95, T98, T126, T136 |
| T97 | T79, T85, T98, T108 |
| T98 | T96, T97, T99, T130 |
| T99 | T81, T87, T98, T109 |
| T100 | T33, T55, T94, T115 |
| T101 | T26, T102, T123, T131 |
| T102 | T101, T104, T124, T132 |
| T103 | T91, T104, T113, T118 |
| T104 | T93, T102, T103, T128 |
| T105 | T26, T73, T82, T110 |
| T106 | T19, T107, T121, T129 |
| T107 | T106, T109, T122, T130 |
| T108 | T97, T109, T113, T118 |
| T109 | T99, T107, T108, T126 |
| T110 | T19, T76, T88, T105 |
| T111 | T12, T112, T125, T135 |
| T112 | T111, T114, T126, T136 |
| T113 | T79, T103, T108, T114 |
| T114 | T81, T112, T113, T124 |
| T115 | T12, T70, T100, T120 |
| T116 | T5, T117, T127, T133 |
| T117 | T116, T119, T128, T134 |
| T118 | T85, T103, T108, T119 |
| T119 | T87, T117, T118, T122 |
| T120 | T5, T67, T94, T115 |
| T121 | T76, T83, T106, T122 |
| T122 | T84, T107, T119, T121 |
| T123 | T73, T77, T101, T124 |
| T124 | T78, T102, T114, T123 |
| T125 | T70, T95, T111, T126 |
| T126 | T96, T109, T112, T125 |
| T127 | T67, T89, T116, T128 |
| T128 | T90, T104, T117, T127 |
| T129 | T64, T83, T106, T130 |
| T130 | T84, T98, T107, T129 |
| T131 | T61, T77, T101, T132 |
| T132 | T78, T92, T102, T131 |
| T133 | T58, T89, T116, T134 |
| T134 | T86, T90, T117, T133 |
| T135 | T55, T95, T111, T136 |
| T136 | T80, T96, T112, T135 |

Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony.

In one embodiment, this new crystalline silicate compound has a composition $mR:aX_2O_3:YO_2.nH_2O$ where R is an organic compound, and X is any metal capable of tetrahedral coordination such as one or more of B, Al, Ga, Fe, Li, Be, P, Zn, Cr, Mg, Co, Ni, Mn, As, In, Sn, Sb, Ti, and Zr, more preferably one or more trivalent metals capable of tetrahedral coordination, and even more preferably one or more of the elements B, Ga, Al, and Fe, and Y is Si alone or in combination with any other tetravalent metal capable of tetrahedral coordination such as Ge and Ti and where m=0.01-1, a=0.00-0.2, and n=0-10. This compound has the unique diffraction pattern given in Table 2 and shown in FIG. 3.

TABLE 2

X-ray diffraction lines for as-synthesized ITQ-26

| d (Å) | relative int. (%) |
|---|---|
| 13.8-13.0 | 60-100 |
| 12.3-11.6 | 5-40 |
| 9.09-8.73 | 30-80 |
| 6.55-6.37 | 5-50 |
| 4.76-4.66 | 5-50 |
| 4.49-4.40 | 20-70 |
| 4.20-4.12 | 50-100 |
| 3.81-3.75 | 5-50 |
| 3.69-3.63 | 5-50 |
| 3.36-3.31 | 30-80 |
| 2.998-2.959 | 5-40 |
| 2.846-2.811 | 5-40 |
| 2.624-2.594 | 5-40 |
| 2.503-2.476 | 5-40 |
| 2.366-2.342 | 5-40 |

Other embodiments of the new structure include a calcined compound of composition $aX_2O_3$:$YO_2$.$nH_2O$, where X is any metal capable of tetrahedral coordination such as one or more of B, Ga, Al, Fe, Li, Be, P, Zn, Cr, Mg, Co, Ni, Mn, As, In, Sn, Sb, Ti, and Zr, more preferably one or more trivalent metals capable of tetrahedral coordination, and even more preferably one or more of the elements B, Ga, Al, Fe, and Y is Si alone or in combination with any other tetravalent metal capable of tetrahedral coordination such as Ge and Ti and where a=0.00-0.2, and n=0-10. This compound has the unique diffraction pattern given in Table 3 and FIG. 4.

TABLE 3

X-ray diffraction lines for calcined/dehydrated ITQ-26

| d (Å) | relative int. (%) |
|---|---|
| 13.7-13.0 | 60-100 |
| 12.2-11.6 | 20-70 |
| 9.63-9.27 | 1-10 |
| 9.03-8.72 | 20-70 |
| 6.55-6.39 | 1-10 |
| 5.01-4.91 | 1-10 |
| 4.75-4.66 | 1-20 |
| 4.50-4.42 | 1-20 |
| 4.39-4.32 | 1-10 |
| 4.21-4.14 | 1-20 |
| 4.17-4.10 | 1-20 |
| 3.82-3.76 | 1-10 |
| 3.70-3.65 | 1-20 |
| 3.37-3.32 | 1-20 |
| 3.33-3.29 | 1-10 |
| 3.14-3.10 | 1-10 |

This new compound is made by the method of mixing together a source of silica, organic structure directing agent (SDA), water, and optional source of metal and heating at a temperature and time sufficient to crystallize the silicate. The method is described below.

The synthetic porous crystalline material of this invention, ITQ-26, is a crystalline phase which has a unique 3-dimensional channel system comprising intersecting 12-membered rings of tetrahedrally coordinated atoms. The 12-membered ring channels have cross-sectional dimensions between the bridging oxygen atoms of about 7.8 Ångströms by about 6.8 Ångströms along one direction and about 7.1 Ångströms by about 6.6 Ångströms along the other two directions.

Variations in the X-ray diffraction pattern may occur between the different chemical composition forms of ITQ-26, such that the exact ITQ-26 structure can vary due its particular composition and whether or not it has been calcined and rehydrated.

In the as-synthesized form ITQ-26 has a characteristic X-ray diffraction pattern, the essential lines of which are given in Table 2 measured with Cu Kα radiation. Variations occur as a function of specific composition and its loading in the structure. For this reason the intensities and d-spacings are given as ranges.

The ITQ-26 material of the present invention may be calcined to remove the organic templating agent without loss of crystallinity. This is useful for activating the material for subsequent absorption of other guest molecules such as hydrocarbons. The essential lines, which uniquely define calcined/dehydrated ITQ-26 are shown in Table 3 measured with synchrotron radiation. Variations occur as a function of specific composition, temperature and the level of hydration in the structure. For this reason the intensities and d-spacings are given as ranges.

Figure 2:
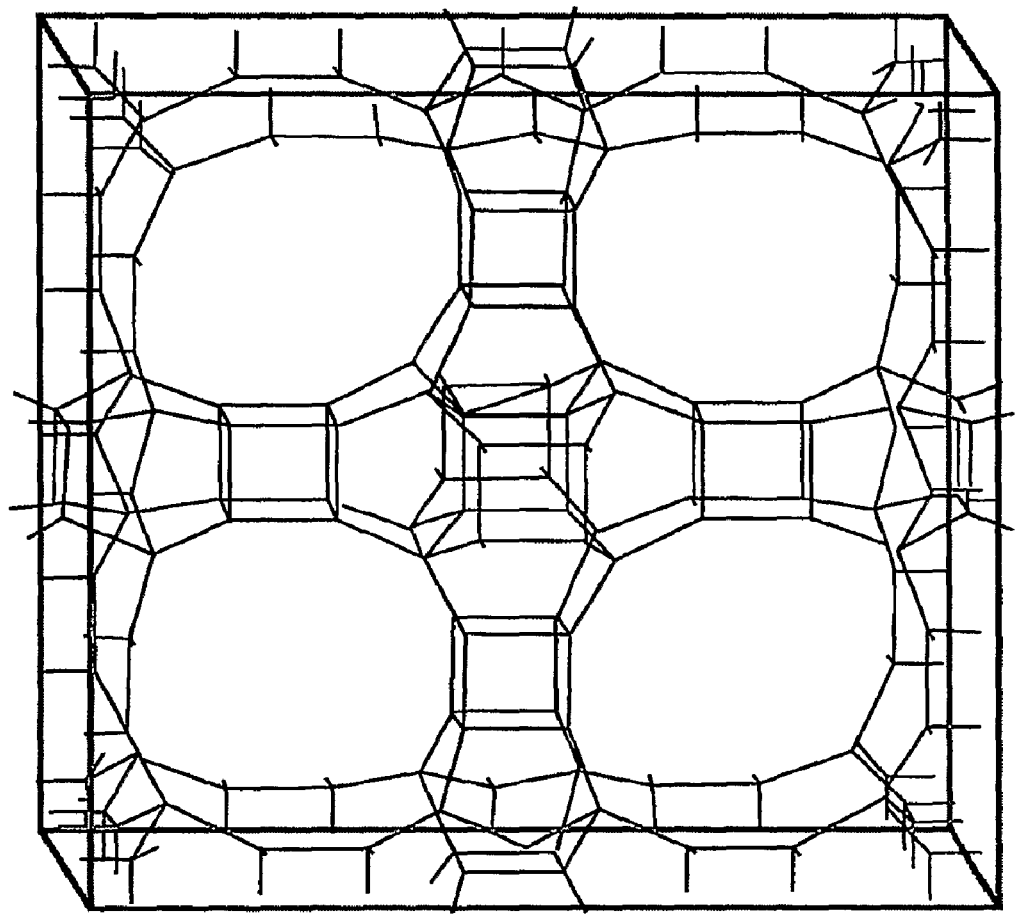
FIG. 2 shows the framework structure of ITQ-26 showing only the tetrahedral atoms. There is one unit cell, whose edges are defined by the gray box.

In addition, to describing the structure of ITQ-26 by the interconnections of the tetrahedral atoms as in Table 1 above, it may be defined by its unit cell, which is the smallest repeating unit containing all the structural elements of the material. The pore structure of ITQ-26 is illustrated in FIG. 2 (which shows only the tetrahedral atoms) down the direction of the 12-membered ring channels. There is a single unit cell unit in FIG. 2, whose limits are defined by the box. Table 4 lists the typical positions of each tetrahedral atom in the unit cell in units of Ångströms. Each tetrahedral atom is bonded to bridging atoms, which are also bonded to adjacent tetrahedral atoms. Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony. Bridging atoms are those capable of connecting two tetrahedral atoms, examples which include, but not limiting, oxygen, nitrogen, fluorine, sulfur, selenium, and carbon atoms.

In the case of oxygen, it is also possible that the bridging oxygen is also connected to a hydrogen atom to form a hydroxyl group (—OH—). In the case of carbon it is also possible that the carbon is also connected to two hydrogen atoms to form a methylene group (—$CH_2$—). For example, bridging methylene groups have been seen in the zirconium diphosphonate, MIL-57. See: C. Serre, G. Férey, *J. Mater. Chem.* 12, p. 2367 (2002). Bridging sulfur and selenium atoms have been seen in the UCR-20-23 family of microporous materials. See: N. Zheng, X. Bu, B. Wang, P. Feng, *Science* 298, p. 2366 (2002). Bridging fluorine atoms have been seen in lithium hydrazinium fluoroberyllate, which has the ABW structure type. See: M. R. Anderson, I. D. Brown, S. Vilminot, *Acta Cryst*. B29, p. 2626 (1973). Since tetrahedral atoms may move about due to other crystal forces (presence of inorganic or organic species, for example), or by the choice of tetrahedral and bridging atoms, a range of ±1.0 Ångström is implied for the x and y coordinate positions and a range of ±0.5 Ångström for the z coordinate positions.

TABLE 4

Positions of tetrahedral (T) atoms for the ITQ-26 structure. Values, in units of Ångströms, are approximate and are typical when T = silicon and the bridging atoms are oxygen.

| Atom | x (Å) | y (Å) | z (Å) |
| --- | --- | --- | --- |
| T1 | 1.559 | 8.591 | 1.558 |
| T2 | 1.559 | 5.478 | 1.559 |
| T3 | 1.559 | 1.559 | 5.056 |
| T4 | 2.791 | 2.791 | 2.490 |
| T5 | 2.352 | 11.023 | 3.307 |
| T6 | 1.531 | 1.531 | 0.000 |
| T7 | 0.000 | 11.844 | 5.084 |
| T8 | 25.191 | 18.159 | 1.558 |
| T9 | 25.191 | 21.272 | 1.559 |
| T10 | 25.191 | 25.191 | 5.056 |
| T11 | 23.959 | 23.959 | 2.490 |
| T12 | 24.398 | 15.727 | 3.307 |
| T13 | 25.219 | 25.219 | 0.000 |
| T14 | 0.000 | 14.906 | 5.084 |
| T15 | 18.159 | 1.559 | 1.558 |
| T16 | 21.272 | 1.559 | 1.559 |
| T17 | 25.191 | 1.559 | 5.056 |
| T18 | 23.959 | 2.791 | 2.490 |
| T19 | 15.727 | 2.352 | 3.307 |
| T20 | 25.219 | 1.531 | 0.000 |
| T21 | 14.906 | 0.000 | 5.084 |
| T22 | 8.591 | 25.191 | 1.558 |
| T23 | 5.478 | 25.191 | 1.559 |
| T24 | 1.559 | 25.191 | 5.056 |
| T25 | 2.791 | 23.959 | 2.490 |
| T26 | 11.023 | 24.398 | 3.307 |
| T27 | 1.531 | 25.219 | 0.000 |
| T28 | 11.844 | 0.000 | 5.084 |
| T29 | 25.191 | 8.591 | 11.672 |
| T30 | 25.191 | 5.478 | 11.671 |
| T31 | 25.191 | 1.559 | 8.174 |
| T32 | 23.959 | 2.791 | 10.740 |
| T33 | 24.398 | 11.023 | 9.922 |
| T34 | 0.000 | 11.844 | 8.146 |
| T35 | 1.559 | 18.159 | 11.672 |
| T36 | 1.559 | 21.272 | 11.671 |
| T37 | 1.559 | 25.191 | 8.174 |
| T38 | 2.791 | 23.959 | 10.740 |
| T39 | 2.352 | 15.727 | 9.922 |
| T40 | 0.000 | 14.906 | 8.146 |
| T41 | 8.591 | 1.559 | 11.672 |
| T42 | 5.478 | 1.559 | 11.671 |
| T43 | 1.559 | 1.559 | 8.174 |
| T44 | 2.791 | 2.791 | 10.740 |
| T45 | 11.023 | 2.352 | 9.922 |
| T46 | 11.844 | 0.000 | 8.146 |
| T47 | 18.159 | 25.191 | 11.672 |
| T48 | 21.272 | 25.191 | 11.671 |
| T49 | 25.191 | 25.191 | 8.174 |
| T50 | 23.959 | 23.959 | 10.740 |
| T51 | 15.727 | 24.398 | 9.922 |
| T52 | 14.906 | 0.000 | 8.146 |
| T53 | 25.191 | 18.159 | 11.672 |
| T54 | 25.191 | 21.272 | 11.671 |
| T55 | 24.398 | 15.727 | 9.922 |
| T56 | 1.559 | 8.591 | 11.672 |
| T57 | 1.559 | 5.478 | 11.671 |
| T58 | 2.352 | 11.023 | 9.922 |
| T59 | 8.591 | 25.191 | 11.672 |
| T60 | 5.478 | 25.191 | 11.671 |
| T61 | 11.023 | 24.398 | 9.922 |
| T62 | 18.159 | 1.559 | 11.672 |
| T63 | 21.272 | 1.559 | 11.671 |
| T64 | 15.727 | 2.352 | 9.922 |
| T65 | 1.559 | 18.159 | 1.558 |
| T66 | 1.559 | 21.272 | 1.559 |
| T67 | 2.352 | 15.727 | 3.307 |
| T68 | 25.191 | 8.591 | 1.558 |
| T69 | 25.191 | 5.478 | 1.559 |
| T70 | 24.398 | 11.023 | 3.307 |
| T71 | 18.159 | 25.191 | 1.558 |
| T72 | 21.272 | 25.191 | 1.559 |
| T73 | 15.727 | 24.398 | 3.307 |
| T74 | 8.591 | 1.559 | 1.558 |
| T75 | 5.478 | 1.559 | 1.559 |
| T76 | 11.023 | 2.352 | 3.307 |
| T77 | 14.934 | 21.966 | 8.173 |
| T78 | 14.934 | 18.853 | 8.174 |
| T79 | 14.934 | 14.934 | 11.671 |
| T80 | 16.166 | 16.166 | 9.105 |
| T81 | 14.906 | 14.906 | 6.615 |
| T82 | 13.375 | 25.219 | 11.699 |
| T83 | 11.816 | 4.784 | 8.173 |
| T84 | 11.816 | 7.897 | 8.174 |
| T85 | 11.816 | 11.816 | 11.671 |
| T86 | 10.584 | 10.584 | 9.105 |
| T87 | 11.844 | 11.844 | 6.615 |
| T88 | 13.375 | 1.531 | 11.699 |
| T89 | 4.784 | 14.934 | 8.173 |
| T90 | 7.897 | 14.934 | 8.174 |
| T91 | 11.816 | 14.934 | 11.671 |
| T92 | 10.584 | 16.166 | 9.105 |
| T93 | 11.844 | 14.906 | 6.615 |
| T94 | 1.531 | 13.375 | 11.699 |
| T95 | 21.966 | 11.816 | 8.173 |
| T96 | 18.853 | 11.816 | 8.174 |
| T97 | 14.934 | 11.816 | 11.671 |
| T98 | 16.166 | 10.584 | 9.105 |
| T99 | 14.906 | 11.844 | 6.615 |
| T100 | 25.219 | 13.375 | 11.699 |
| T101 | 11.816 | 21.966 | 5.057 |
| T102 | 11.816 | 18.853 | 5.056 |
| T103 | 11.816 | 14.934 | 1.559 |
| T104 | 10.584 | 16.166 | 4.125 |
| T105 | 13.375 | 25.219 | 1.531 |
| T106 | 14.934 | 4.784 | 5.057 |
| T107 | 14.934 | 7.897 | 5.056 |
| T108 | 14.934 | 11.816 | 1.559 |
| T109 | 16.166 | 10.584 | 4.125 |
| T110 | 13.375 | 1.531 | 1.531 |
| T111 | 21.966 | 14.934 | 5.057 |
| T112 | 18.853 | 14.934 | 5.056 |
| T113 | 14.934 | 14.934 | 1.559 |
| T114 | 16.166 | 16.166 | 4.125 |
| T115 | 25.219 | 13.375 | 1.531 |
| T116 | 4.784 | 11.816 | 5.057 |
| T117 | 7.897 | 11.816 | 5.056 |
| T118 | 11.816 | 11.816 | 1.559 |
| T119 | 10.584 | 10.584 | 4.125 |
| T120 | 1.531 | 13.375 | 1.531 |
| T121 | 11.816 | 4.784 | 5.057 |
| T122 | 11.816 | 7.897 | 5.056 |
| T123 | 14.934 | 21.966 | 5.057 |
| T124 | 14.934 | 18.853 | 5.056 |
| T125 | 21.966 | 11.816 | 5.057 |
| T126 | 18.853 | 11.816 | 5.056 |
| T127 | 4.784 | 14.934 | 5.057 |
| T128 | 7.897 | 14.934 | 5.056 |
| T129 | 14.934 | 4.784 | 8.173 |
| T130 | 14.934 | 7.897 | 8.174 |
| T131 | 11.816 | 21.966 | 8.173 |
| T132 | 11.816 | 18.853 | 8.174 |
| T133 | 4.784 | 11.816 | 8.173 |
| T134 | 7.897 | 11.816 | 8.174 |
| T135 | 21.966 | 14.934 | 8.173 |
| T136 | 18.853 | 14.934 | 8.174 |

The complete structure of ITQ-26 is built by connecting multiple unit cells as defined above in a fully-connected three-dimensional framework. The tetrahedral atoms in one unit cell are connected to certain tetrahedral atoms in all of its adjacent unit cells. While Table 1 lists the connections of all the tetrahedral atoms for a given unit cell of ITQ-26, the connections may not be to the particular atom in the same unit cell but to an adjacent unit cell. All of the connections listed in Table 1 are such that they are to the closest tetrahedral (T) atoms, regardless of whether they are in the same unit cell or in adjacent unit cells.

Although the Cartesian coordinates given in Table 4 may accurately reflect the positions of tetrahedral atoms in an idealized structure, the true structure can be more accurately described by the connectivity between the framework atoms as shown in Table 1 above.

Another way to describe this connectivity is by the use of coordination sequences as applied to microporous frameworks by W. M. Meier and H. J. Moeck, in the *Journal of Solid State Chemistry* 27, p. 349 (1979). In a microporous framework, each tetrahedral atom, No, (T-atom) is connected to $N_1=4$ neighboring T-atoms through bridging atoms (typically oxygen). These neighboring T-atoms are then connected to $N_2$ T-atoms in the next shell. The $N_2$ atoms in the second shell are connected to $N_3$ T-atoms in the third shell, and so on. Each T-atom is only counted once, such that, for example, if a T-atom is in a 4-membered ring, at the fourth shell the No atom is not counted second time, and so on. Using this methodology, a coordination sequence can be determined for each unique T-atom of a 4-connected net of T-atoms. The following line lists the maximum number of T-atoms for each shell.

$N_0=1\ N_1\leq4\ N_2\leq12\ N_3\leq36\ N_k\leq4\cdot3^{k-1}$

TABLE 5

Coordination sequence for ITQ-26 structure.

| atom number | atom label | coordination sequence | | | | | | | | | | | |
|---|---|---|---|---|---|---|---|---|---|---|---|---|---|
| 1 | T(1) | 4 | 9 | 18 | 31 | 47 | 66 | 94 | 127 | 159 | 188 | 226 | 287 | 345 |
| 2 | T(2) | 4 | 9 | 17 | 29 | 44 | 68 | 97 | 125 | 154 | 190 | 240 | 292 | 338 |
| 3 | T(3) | 4 | 9 | 18 | 30 | 42 | 60 | 89 | 126 | 162 | 188 | 222 | 281 | 349 |
| 4 | T(4) | 4 | 12 | 18 | 27 | 48 | 69 | 94 | 124 | 160 | 201 | 237 | 285 | 330 |
| 5 | T(5) | 4 | 12 | 17 | 30 | 46 | 67 | 90 | 124 | 158 | 186 | 230 | 279 | 344 |
| 6 | T(6) | 4 | 11 | 20 | 24 | 36 | 72 | 110 | 126 | 136 | 182 | 256 | 306 | 326 |
| 7 | T(7) | 4 | 11 | 20 | 28 | 42 | 70 | 100 | 120 | 146 | 186 | 232 | 291 | 349 |

One way to determine the coordination sequence for a given structure is from the atomic coordinates of the framework atoms using the computer program zeoTsites (see G. Sastre, J. D. Gale, *Microporous and mesoporous Materials* 43, p. 27 (2001).

The coordination sequence for the ITQ-26 structure is given in Table 5. The T-atom connectivity as listed in Table 1 and is for T-atoms only. Bridging atoms, such as oxygen usually connects the T-atoms. Although most of the T-atoms are connected to other T-atoms through bridging atoms, it is recognized that in a particular crystal of a material having a framework structure, it is possible that a number of T-atoms may not connected to one another. Reasons for non-connectivity include, but are not limited by; T-atoms located at the edges of the crystals and by defects sites caused by, for example, vacancies in the crystal. The framework listed in Table 1 and Table 5 is not limited in any way by its composition, unit cell dimensions or space group symmetry.

While the idealized structure contains only 4-coordinate T-atoms, it is possible under certain conditions that some of the framework atoms may be 5- or 6-coordinate. This may occur, for example, under conditions of hydration when the composition of the material contains mainly phosphorous and aluminum T-atoms. When this occurs it is found that T-atoms may be also coordinated to one or two oxygen atoms of water molecules (—OH$_2$), or of hydroxyl groups (—OH). For example, the molecular sieve AlPO$_4$-34 is known to reversibly change the coordination of some aluminum T-atoms from 4-coordinate to 5- and 6-coordinate upon hydration as described by A. Tuel et al. in *J. Phys. Chem. B* 104, p. 5697 (2000). It is also possible that some framework T-atoms can be coordinated to fluoride atoms (—F) when materials are prepared in the presence of fluorine to make materials with 5-coordinate T-atoms as described by H. Koller in *J. Am. Chem. Soc.* 121, p. 3368 (1999).

The invention also includes a method of synthesizing a crystalline silicate composition of ITQ-26 having the diffraction pattern similar to Table 2 by mixing together a source of silica, organic structure directing agent (SDA), water, and optional metal, X, with a composition, in terms of mole ratios, within the following ranges:

| | |
|---|---|
| R/YO$_2$ | 0.01-1 |
| H$_2$O/YO$_2$ | 2-50 |
| X/YO$_2$ | 0-.2 | and preferably within the following ranges:

| | |
|---|---|
| R/YO$_2$ | 0.1-.5 |
| H$_2$O/YO$_2$ | 5-20 |
| X/YO$_2$ | 0-.1 | and X is any metal capable of tetrahedral coordination such as one or more of B, Ga, Al, Fe, Li, Be, P, Zn, Cr, Mg, Co, Ni, Be, Mn, As, In, Sn, Sb, Ti, and Zr, more preferably one or more trivalent metals capable of tetrahedral coordination, and even more preferably one or more of the elements B, Ga, Al, and Fe, and Y is Si alone or in combination with any other tetravalent metal capable of tetrahedral coordination such as Ge and Ti.

Said organic structure directing agent (SDA) is preferably 1,3-bis-(triethylphosphoniummethyl)-benzene. See FIG. 1. Sources of silica can be colloidal, fumed or precipitated silica, silica gel, sodium or potassium silicates, or organic silicon such as tetraethylorthosilicate, etc. Sources of metal can be boric acid, germanium (IV) ethoxide, germanium oxide, germanium nitrate, aluminum nitrate, sodium aluminate, aluminum sulfate, aluminum hydroxide, aluminum chloride and various salts of the metals X such as iron nitrate, iron chloride, and gallium nitrate, etc. The mixture is then heated at a temperature and time sufficient to crystallize the silicate.

To the extent desired and depending on the $X_2O_3/YO_2$ molar ratio of the material, any cations present in the as-synthesized ITQ-26 can be replaced in accordance with techniques well known in the art by ion exchange with other cations. Preferred replacing cations include metal ions, hydrogen ions, and hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline material of this invention can be used to catalyze a wide variety of chemical conversion processes, particularly organic compound conversion processes, including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Thus, in its active form ITQ-26 can exhibit a high acid activity, which can be measured with the alpha test. Alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis* 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis* 61, 395 (1980).

When used as a catalyst, the crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 927° C. The thermally treated product, especially in its metal, hydrogen and ammonium forms, is particularly useful in the catalysis of certain organic, e.g., hydrocarbon, conversion reactions.

When used as a catalyst, the crystalline material can be intimately combined with a hydrogenating component such as tungsten, vanadium, molybdenum, rhenium, nickel, cobalt, chromium, manganese, or a noble metal such as, but not limited to, platinum or palladium where a hydrogenation-dehydrogenation function is to be performed. Such component can be in the composition by way of co-crystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating ITQ-26 with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 100° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the ITQ-26 in a vacuum, but a longer time is required to obtain a sufficient amount of dehydration.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following example is presented.

EXAMPLE 1

Synthesis of ITQ-26

The germanium containing gel was prepared, according to the following description: 0.62 of germanium oxide were dissolved in 24.19 g of a solution of 1,3-bis-(triethylphosphoniummethyl)-benzene hydroxide (FIG. 1) with a concentration of 0.62 mol of OH$^-$ in 1000 g of solution. Then, 5.02 g of tetraethylorthosilicate were hydrolyzed in that solution and the mixture was left to evaporate under stirring until complete evaporation of the ethanol formed was achieved. When the weight reached 8.62 g of gel, 0.62 g of HF (48.1% wt.) were added and the mixture was homogenized. The final composition of the gel was:

0.80SiO$_2$: 0.20GeO$_2$: 0.25 m-B(Et$_3$P)$_2$(OH)$_2$: 0.50 HF: 7.50H$_2$0

The mixture was transferred to Teflon-lined stainless steel autoclaves and heated under stirring for 6 days at 175° C. Longer crystallization times gave impure ITQ-26 with a small amount of polymorph C of Beta zeolite.

Figure 3:
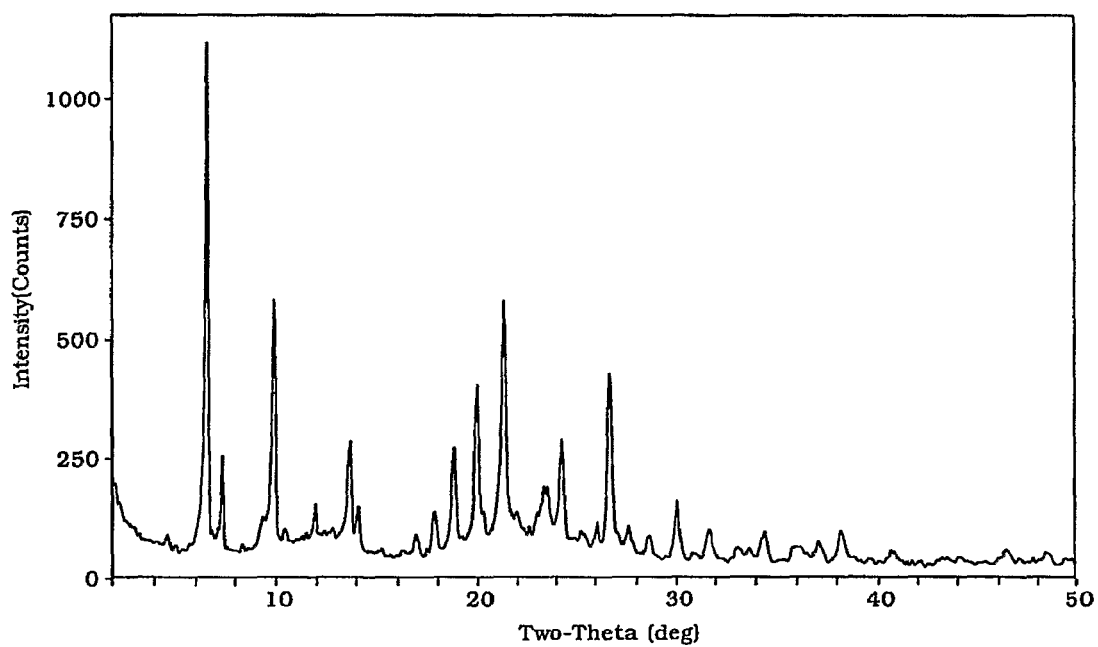
FIG. 3 shows the X-ray diffraction pattern of as-synthesized ITQ-26.
Figure 4:
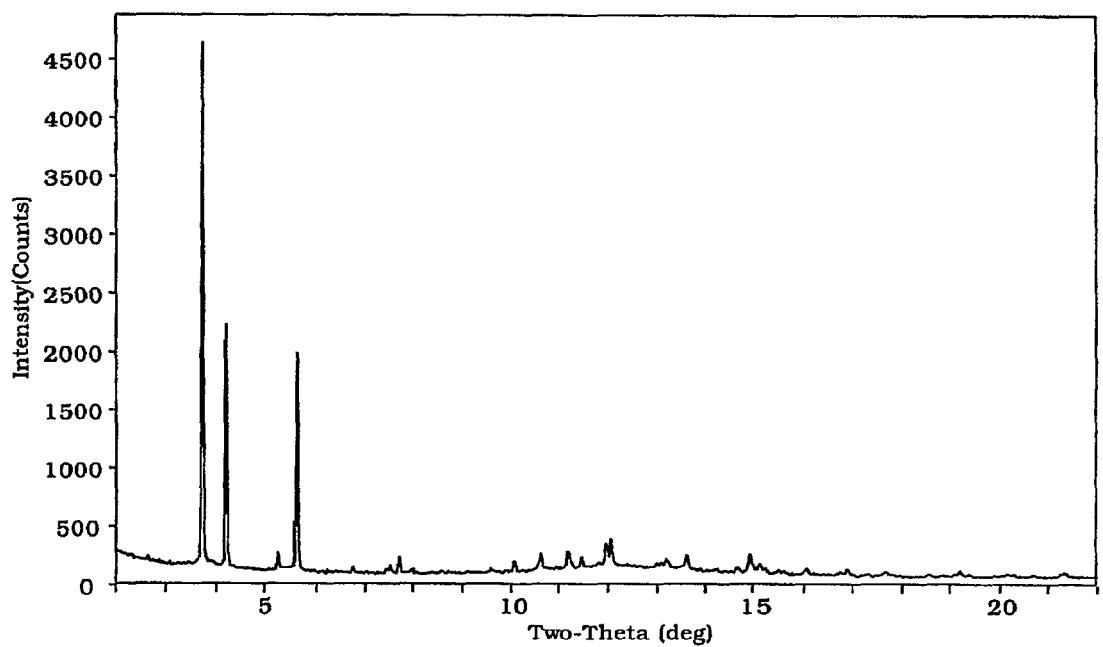
FIG. 4 shows the X-ray diffraction pattern of calcined/dehydrated ITQ-26.

The powder X-ray diffractogram of the sample as made and calcined is shown in FIG. 3 and FIG. 4 below. The sample was calcined in air to 550° C. for 3 hours, cooled down to 300° C., and then sealed under vacuum in a 2 mm quartz capillary tube to minimize structural damage.

The X-ray diffraction patterns are given in Table 6 and Table 7, respectively.

The porosity of the calcined material was measured by adsorbing nitrogen and argon. Adsorption measurements were carried out by manipulating the sample in an inert atmosphere. The results obtained are:

BET surface area: 257 m$^2$/g
Micropore area: 243 m$^2$/g
Micropore volume: 0.12 cm$^3$/g
Pore diameter: 7.1 Å

That data suggest that ITQ-26 is a large pore (12-ring pore aperture) zeolite. This is confirmed by the structure discussed above.

EXAMPLE 2

Synthesis of ITQ-26

The germanium containing gel was prepared, according to the following description: 0.75 of germanium oxide were dissolved in 22.5 g of a solution of 15% wt. 1,3-bis-(triethylphosphoniummethyl)-benzene hydroxide. Then, 6.01 g of tetraethylorthosilicate were hydrolyzed in that solution and the mixture was left to evaporate under stirring until complete evaporation of the ethanol formed was achieved. When the weight reached 10.3 g of gel, 0.74 g of HF (49% wt.) were added and the mixture was homogenized. The final composition of the gel was:

0.80 SiO$_2$: 0.20 GeO$_2$: 0.25 m-B(Et$_3$P)$_2$(OH)$_2$: 0.50 HF: 7.50H$_2$0

The mixture was transferred to a Teflon-lined stainless steel autoclave and heated for 6 days at 175° C. with a tumbling rate of 20 rpm. The sample was recovered by filtration, washed with deionized water and then dried in an 115° C. oven. The X-ray diffraction pattern was measured with Cu Kα radiation and is similar to that given in Table 6 and FIG. 3. Analysis of the X-ray diffraction pattern showed the sample to be pure ITQ-26.

TABLE 6

X-ray powder diffraction lines of as-made ITQ-26 (Cu Kα radiation)

| 2-Theta | d (Å) | I % |
|---|---|---|
| 4.63 | 19.086 | 3 |
| 6.62 | 13.348 | 100 |
| 7.40 | 11.944 | 19 |
| 9.43 | 9.376 | 8 |
| 9.92 | 8.907 | 60 |
| 10.47 | 8.440 | 3 |
| 11.94 | 7.407 | 6 |
| 13.70 | 6.460 | 29 |
| 14.11 | 6.273 | 9 |
| 15.21 | 5.819 | 1 |
| 16.29 | 5.437 | 2 |
| 16.96 | 5.224 | 6 |
| 17.87 | 4.960 | 10 |
| 18.83 | 4.709 | 25 |
| 19.98 | 4.441 | 37 |
| 20.26 | 4.379 | 5 |
| 21.34 | 4.160 | 79 |
| 22.99 | 3.866 | 1 |
| 23.30 | 3.815 | 5 |
| 23.39 | 3.801 | 1 |
| 23.53 | 3.779 | 23 |
| 24.29 | 3.661 | 30 |
| 25.30 | 3.518 | 6 |
| 26.08 | 3.414 | 5 |
| 26.72 | 3.334 | 54 |
| 27.57 | 3.233 | 8 |
| 28.54 | 3.125 | 6 |
| 29.98 | 2.979 | 19 |
| 31.61 | 2.828 | 16 |
| 33.08 | 2.705 | 7 |
| 33.65 | 2.661 | 5 |
| 34.34 | 2.609 | 13 |
| 36.04 | 2.490 | 14 |
| 37.08 | 2.423 | 8 |
| 38.20 | 2.354 | 16 |
| 40.65 | 2.218 | 8 |
| 43.52 | 2.078 | 8 |
| 46.32 | 1.959 | 6 |
| 48.38 | 1.880 | 4 |

TABLE 7

X-ray powder diffraction lines of calcined/dehydrated ITQ-26 (Synchrotron radiation, λ = 0.8702 Å)

| 2-Theta | d (A) | I % |
|---|---|---|
| 2.64 | 18.907 | 1 |
| 3.73 | 13.376 | 100 |
| 4.20 | 11.864 | 41 |
| 5.28 | 9.449 | 4 |
| 5.62 | 8.873 | 42 |
| 6.75 | 7.390 | 1 |
| 7.46 | 6.692 | 1 |
| 7.54 | 6.622 | 2 |
| 7.71 | 6.469 | 4 |
| 7.97 | 6.259 | 1 |
| 9.58 | 5.210 | 2 |
| 10.07 | 4.959 | 4 |
| 10.60 | 4.709 | 8 |
| 11.20 | 4.459 | 7 |
| 11.47 | 4.353 | 3 |
| 11.80 | 4.232 | 2 |
| 11.97 | 4.173 | 9 |
| 12.07 | 4.139 | 9 |
| 13.00 | 3.845 | 1 |
| 13.09 | 3.819 | 1 |
| 13.20 | 3.787 | 4 |
| 13.61 | 3.672 | 5 |
| 14.23 | 3.514 | 1 |
| 14.70 | 3.402 | 2 |
| 14.95 | 3.344 | 9 |
| 15.12 | 3.307 | 4 |
| 15.23 | 3.284 | 1 |
| 15.46 | 3.236 | 2 |

TABLE 7-continued

X-ray powder diffraction lines of calcined/dehydrated ITQ-26
(Synchrotron radiation, λ = 0.8702 Å)

| 2-Theta | d (A) | I % |
|---|---|---|
| 15.58 | 3.211 | 2 |
| 16.05 | 3.117 | 3 |
| 16.74 | 2.989 | 2 |
| 16.89 | 2.963 | 3 |
| 17.67 | 2.832 | 3 |
| 19.20 | 2.608 | 3 |
| 21.31 | 2.353 | 2 |

The invention claimed is:

1. A synthetic crystalline material having a framework of tetrahedral atoms (T) connected by bridging atoms, the tetrahedral atom framework being defined by connecting the nearest tetrahedral (T) atoms in the manner shown in Table 1 of the specification.

2. The crystalline material of claim 1 wherein said tetrahedral atoms include one or more elements selected from the group consisting of Li, Be, Al, P, Si, Ga, Ge, Zn, Cr, Mg, Fe, Co, Ni, Mn, As, In, Sn, Sb, Ti, and Zr.

3. The crystalline material of claims 1 or 2 wherein said bridging atoms include one or more elements selected from the group consisting of O, N, F, S, Se, and C.

4. A synthetic porous crystalline material, as synthesized, characterized by an X-ray diffraction pattern including the peaks as substantially set forth in Table 2 of the specification.

5. The crystalline material of claim 4 wherein said crystalline material has a composition $mR:aX_2O_3:YO_2 \cdot nH_2O$ where R is an organic compound, X is one or more metals selected from the group consisting of B, Ga, Al and Fe, and Y is one or more metals selected from the group consisting of Si, Ge and Ti, and m is a real number less than or equal to 1, a is a real number less than or equal to 0.2 and n is a real number less than or equal to 10.

6. A calcined dehydrated material characterized by an X-ray diffraction pattern including the most significant lines substantially, as set forth in Table 3 of the specification.

7. The calcined dehydrated material of claim 6 wherein said crystalline material has a composition $aX_2O_3:YO_2 \cdot nH_2O$ where X is one or more metals selected from the group consisting of B, Ga, Al and Fe, and Y is one or more metals selected from the group consisting of Si, Ge and Ti, and a is a real number less than or equal to 0.2 and n is a real number less than or equal to 10.

8. A process for the separation of hydrocarbons from a hydrocarbon-containing stream using the material of claim 6.

9. A process for converting a feedstock comprising organic compounds to at least one conversion product which comprises contacting said feedstock at organic compound conversion conditions with a catalyst comprising an active form of the material of claim 6.

10. The process for converting a feedstock of claim 9 wherein the catalyst is combined with a hydrogenating metal.

11. The process for converting a feedstock of claim 10 wherein said hydrogenating metal is one or more metals selected from the group consisting of tungsten, vanadium, molybdenum, rhenium, nickel, cobalt, chromium, manganese, or a noble metal.

12. A method of synthesizing a crystalline silicate composition of ITQ-26 having the diffraction pattern substantially as set forth in Table 2 of the specification by mixing together at least one source of silica, at least one organic structure directing agent (R), water, and optionally a source of metal (X) to form a mixture having a composition, in terms of mole ratios, within the following ranges:

| | |
|---|---|
| $R/YO_2$ | 0.01-1 |
| $H_2O/YO_2$ | 2-50 |
| $X/YO_2$ | 0-.2 | wherein X is any trivalent metal capable of tetrahedral coordination and Y is silicon and optionally any other tetravalent metal capable of tetrahedral coordination.

13. The method according to claim 12 wherein X is one or more metals selected from the group consisting of B, Ga, Al or Fe and Y is silicon and may include one or more metals selected from the group consisting of Ge and Ti.

14. The method of claim 12 wherein said molar ratio ranges are

| | |
|---|---|
| $R/YO_2$ | 0.1-.5 |
| $H_2O/YO_2$ | 5-20 |
| $X/YO_2$ | 0-.1 |

15. A method of synthesizing a crystalline silicate composition of claim 12 wherein said organic structure directing agent (SDA) is 1,3-bis-(triethylphosphoniummethyl)-benzene.

16. The crystalline silicate composition produced using the method of claim 12.

17. A method of synthesizing a crystalline silicate composition of ITQ-26 having the diffraction pattern substantially as set forth in Table 2 of the specification by mixing together a source of silica, organic structure directing agent (R), water, and optionally a source of metal (X), to form a mixture having a composition, in terms of mole ratios, within the following ranges:

| | |
|---|---|
| $R/YO_2$ | 0.01-1 |
| $H2O/YO_2$ | 2-50 |
| $X/YO_2$ | 0-.2 | and wherein X is one or more metals selected from the group consisting of B, Ga, Al, Fe, Li, Be, P, Zn, Cr, Mg, Co, Ni, Mn, As, In, Sn, Sb, Ti, and Zr, and Y is silicon and may include one or more metals selected from the group consisting of Ge and Ti.

* * * * *